United States Patent

Tada et al.

[11] Patent Number: 6,082,087
[45] Date of Patent: *Jul. 4, 2000

[54] PORTABLE TRIMMER AND HANDLE-BAR THEREFOR

[75] Inventors: Osamu Tada; Takayuki Yamamoto, both of Tokyo, Japan

[73] Assignee: Kioritz Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/972,016

[22] Filed: Nov. 17, 1997

[30] Foreign Application Priority Data

Nov. 26, 1996 [JP] Japan ..................................... 8-315232

[51] Int. Cl.$^7$ ............................. A01D 34/67; A01D 34/82
[52] U.S. Cl. ....................................... 56/255; 56/DIG. 18
[58] Field of Search ......................... 172/41, 42; 56/255, 56/249, 239, 233, 12.7, DIG. 18

[56] References Cited

U.S. PATENT DOCUMENTS

| | | | |
|---|---|---|---|
| 4,133,389 | 1/1979 | Ruhl et al. | 172/41 |
| 4,179,805 | 12/1979 | Yamada | 172/41 X |
| 4,213,504 | 7/1980 | Schneider | 172/41 X |
| 4,288,171 | 9/1981 | Kottke . | |
| 4,364,435 | 12/1982 | Tuggle et al. | 172/41 X |
| 4,391,041 | 7/1983 | Porter-bennett | 172/41 X |
| 4,501,332 | 2/1985 | Straayer | 172/41 |
| 4,541,492 | 9/1985 | Motruk | 172/41 |
| 4,662,158 | 5/1987 | Zerrer . | |
| 4,817,738 | 4/1989 | Dorner et al. . | |
| 4,862,682 | 9/1989 | Wait et al. | 172/41 X |
| 5,025,615 | 6/1991 | Hawkenson | 172/41 X |
| 5,031,395 | 7/1991 | Ohkanda et al. | 172/41 X |

OTHER PUBLICATIONS

Catalogue (Husqvarna), 1995.
Catalogue (*STIHL*), 1995, pp. 26, 27 and 34.

*Primary Examiner*—Christopher J. Novosad
*Attorney, Agent, or Firm*—Jacobson, Price, Holman & Stern, PLLC

[57] ABSTRACT

A portable trimmer has a supporting tube extending straight forward from an engine at its rearward end to a cutting device at a forward end. A handle-bar is mounted on a middle portion of the supporting tube at an intersecting point. First and second grips extend upwardly from two corresponding ends of the handle-bar. The handle-bar has a first portion extending from an intersecting point to the first grip, and a second portion extending from the intersecting point to the second grip. The first portion extends across a width of an operator's body, and is bent in a rearward direction. The supporting tube has an inclination with respect to a phantom line connecting the first and second grips such that said cutting device is located in front of a center of the operator's body when the operator holds the grips in a natural posture. This portable trimmer increases the area in which weeds can be cut in a single movement, and provides for easy handling.

4 Claims, 6 Drawing Sheets

PORTABLE TRIMMER AND HANDLE-BAR THEREFOR

BACKGROUND OF THE INVENTION

The present invention relates to a portable trimmer for cutting weeds or the like, and, more particularly, to a handle bar of a portable trimmer.

DESCRIPTION OF THE PRIOR ART

A portable trimmer for cutting weeds or the like has been conventionally known and such a portable trimmer is operated while an operator is standing. As shown in FIG. 6, a typical conventional portable trimmer 50 has a compact air cooled type 2-stroke internal combustion engine 52, a supporting tube 54 extending straight from the internal combustion engine 52 in a forward direction and having an output shaft therein, a rotatable cutter 56 or a cutting device provided at a forward end of the supporting tube 54, and a handle 58 mounted on a middle portion of the supporting tube 54. The handle 58 of the portable trimmer 50 typically has a U-shaped handle-bar 60 extending in a lateral direction and mounted on the supporting tube 54 on the left and right sides symmetrically with respect to the supporting tube 54, and grips 62, 62, each of which being provided at the left and right ends of the handle-bar 60 respectively. A shoulder strap 64 for supporting the portable trimmer 50 is attached to the supporting tube 54 by a mounting bracket 63 at a location rearward of the handle 58. The operator hangs the shoulder strap 64 over the shoulder and supports the portable trimmer 50 by the side of the operators' body at a height corresponding to the hip.

When a trimming operation is carried out by using the portable trimmer 50, the operator generally cuts the weeds in different ways depending on the kind of plants. A first way of cutting plants is when relatively soft weeds which can be cut by a small force are trimmed. In such a case, the operator moves the right and left hands which hold the grips 62, 62 in forward and rearward directions alternatively without twisting the waist, thereby moving the cutter 56 provided at the forward end of the supporting tube 54 to the right and to the left to cut the weeds since this way least fatigue the operator. The second way is when relatively hard plants such as reeds are cut. In such a case, the operator fixes both arms to fix a position of the supporting tube 54, i.e. the cutter 56, with respect to the body and twist the waist, thereby moving the cutter 56 in the right and left directions.

However, in such a portable trimmer, there are still some points which need to be improved with respect to handling. First, to cut the weeds by the portable trimmer 50, a left side arcuate portion of the cutter 56 is generally used. Therefore, as in the first case where the right and left hands are moved alternatively in the forward and rearward directions, an area where the weeds can be trimmed in one movement of the hands is determined by a moving distance of the cutter 56 to the left. However, in the conventional U-shaped handle-bar 60 of a symmetrical shape, the grip 62 on the operator's side, i.e. usually, the grip 62 on the left side, is located in front of the stomach of the body. Therefore, the grip 62 can not be moved a long distance in the rearward direction and therefore, the area where the weeds can be trimmed in one movement is limited to within a relatively small area.

In the second case, it is preferable to fix the arms at the sides of the body because the operator needs to cut the plants by a relatively strong force. However, when using the conventional U-shaped handle 58, the arms need to be fixed in an unnatural posture, that is the arms need to be fixed in a position inclining toward the grips. Therefore, the operator is fatigued especially after many hours of work.

SUMMARY OF THE INVENTION

It is, therefore, an object of the present invention to provide a portable trimmer which enable to increase an area where the weeds can be cut in one movement in the first case as mentioned above.

It is a further object of the present invention to provide a portable trimmer providing easy handling.

The above and other objects of the present invention can be accomplished by a portable trimmer, comprising: driving means; a supporting tube extending straight from the driving means in a forward direction; a cutting device provided at a forward end of the supporting tube; and a handle-bar intersecting at an middle portion of the supporting tube and being mounted thereon; a pair of grips provided at both ends of the handle-bar and extending in a upward direction; the handle-bar having a first portion extending from the intersecting point to one of the grips and a second portion extending from the intersecting point to the other grip, the first portion extending across a width of the body of an operator and then bend in a rearward direction. Since a receiving area for the body of the operator is formed behind the first portion of the handle-bar, the handle can be moved rearwardly over a long distance without interfering with the body and enables to move the cutter in a lateral direction. Thus, an area where the plants can be cut can be increased. Further, the handle-bar does not interfere with the body and therefore, it does not give unpleasantness to the operator.

In a preferred aspect of the present invention, the first portion is inclined upwardly in a direction leaving from the supporting tube. Since the portion bent rearwardly of the first portion is located at a height corresponding to a height of the waist of the operator during a normal usage, the operator can hold the handle in a natural posture by bending the elbows at the sides of the body. Therefore, the operator is least fatigued by the operation of the portable trimmer. Further, the interference between the handle-bar and the hip can be avoided.

In a further preferred aspect of the present invention, the grip of the second portion is located in the vicinity of the side of the body of the operator when the operator holds the grip of said first portion.

Therefore, the cutter can be fixed with respect to the body while taking a natural posture with the elbows bended at the sides of the body. It improves the handling of the portable trimmer and can decrease fatigue of the operator.

In a still further preferred aspect of the present invention, said supporting tube is provided at an inclination with respect to a phantom line connecting said grips so that said cutting device is located in front of the body of the operator. Therefore, the cutter moves along a symmetrical locus with respect to the center of the body, It facilitates the trimming operation.

The above and other objects and features of the present invention will become apparent from the following description made with reference to the accompanying drawings.

DESCRIPTION OF THE PREFERRED EMBODIMENTS

A preferred embodiment of the present invention shall be explained with reference to the drawings attached hereto.

Figure 1:
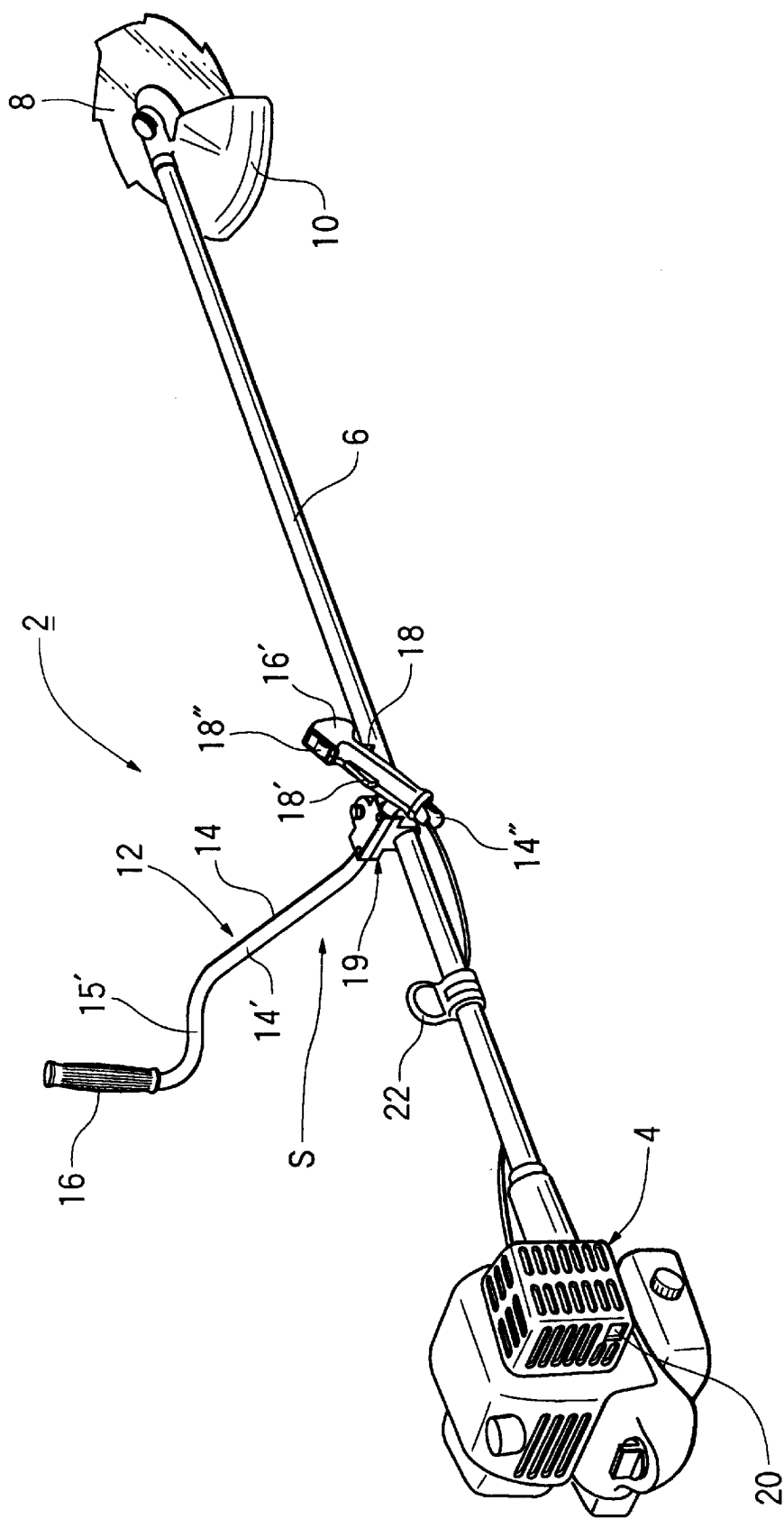
FIG. 1 is a perspective entire view showing a portable trimmer as seen from the right rearward side thereof in accordance with an embodiment of the present invention.

As shown in FIG. 1, a portable trimmer 2 comprises a compact air cooled type 2-stroke internal combustion engine 4 or driving means, a supporting tube 6 extending straight from the engine 4 in a forward direction in which an output shaft (not shown) extending from the engine 4 is inserted, a circular rotatable cutter 8 provided at a forward end of the supporting tube 6 and being rotatably driven by the engine 4, a safety shield 10 for preventing objects scattered by the cutter 8 from hitting the operator, and a handle 12. The handle 12 has a handle-bar 14 which intersects with the supporting tube 6 and extends to the right side and left side with respect to the supporting tube 6 in a lateral direction. The handle-bar 14 is formed of one tube made of a light weight material. The handle 12 further includes a pair of right and left grips 16, 16' which are mounted on both ends of the handle-bar 14. A throttle lever 18 for adjusting a rotational speed of the engine 4, a grip safety lever 18' and an engine stop switch 18" are mounted on the right grip 16'. As stated herein below in more detail, the handle-bar 14 has a first portion or a left side portion 14', and a second portion or a right side portion 14" with respect to the supporting tube 6. The body 17 of the operator is usually located on the left side of the supporting tube 6. Therefore, the left portion 14' and the right portion 14" have different lengths, the left portion 14' being longer than the right portion 14". It is to be noted that an exhaust port 20 of the engine 4 is located on the right side of the supporting tube 6, that is, it is disposed on the far side of the supporting tube 6 with respect to the body 17 of the operator. Further, a mounting bracket 22 for removably attaching a shoulder strap (not shown) for supporting the portable trimmer 2 is attached to the supporting tube 6 between the handle-bar 14 and the engine 4.

Figure 2:
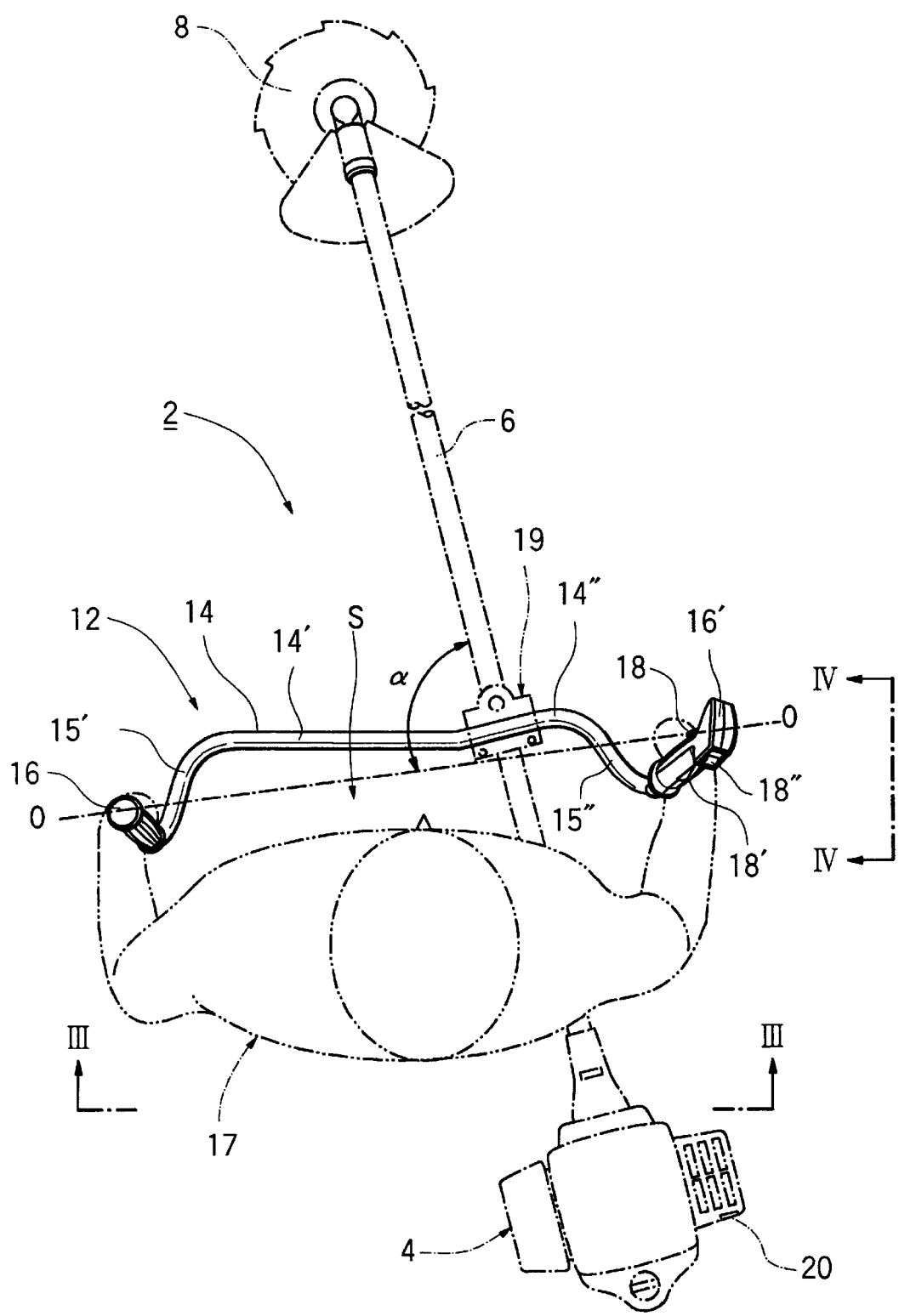
FIG. 2 is a schematic plan view of the portable trimmer showing positional relationship between the body of an operator in a posture and the portable trimmer.

As can be understood from FIG. 2, the left side portion 14' of the handle-bar 14 has a portion extending across a width of the body 17 of the operator and a bent portion 15' bent rearwardly therefrom. The right side portion 14' of the handle-bar 14 has a portion extending in the vicinity of the side of the operator's body 17 and a bent portion 15" bent rearwardly. Therefore, the handle-bar 14 has a U-shape in which the open end thereof is oriented toward the body 17 of the operator in a horizontal plane and a body receiving area S is formed behind the handle-bar 14. The bent portions 15' and 15" are substantially equal in length. Therefore, the grips 16,16' are located at locations where the operator can hold them by the right and left hands when the operator takes a natural posture by bending the arms and fixing the arms to the sides of the body 17.

The left portion 14' of the handle-bar 14 is slightly bent in a forward direction so that an angle α between a phantom line O—O which connects the right and left grips 16, 16' and the supporting tube 6 is smaller than 90 degrees, whereby the cutter 8 is located in front of and at the center of the body 17 when the operator holds the grips 16, 16' in a natural posture. It is to be noted that the handle-bar 14 is attached to the supporting bar 6 by a vibration isolation fitting 19 in such a way that the orientation thereof can be adjusted.

Figure 3:
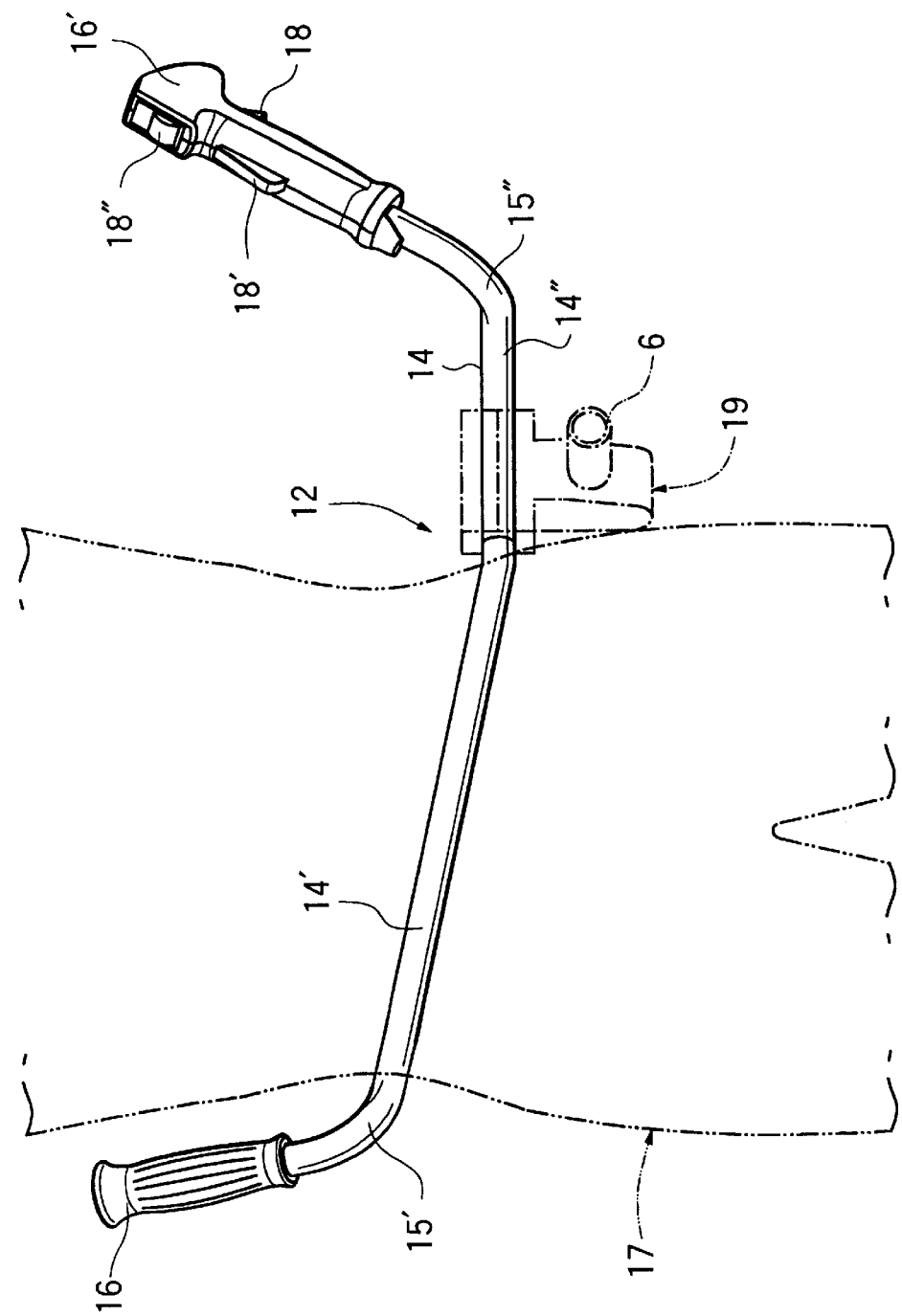
FIG. 3 is a back view of the handle seen in a direction indicated by a line III—III in FIG. 2 and shows a positional relationship between the body of the operator and the handle.
Figure 4:
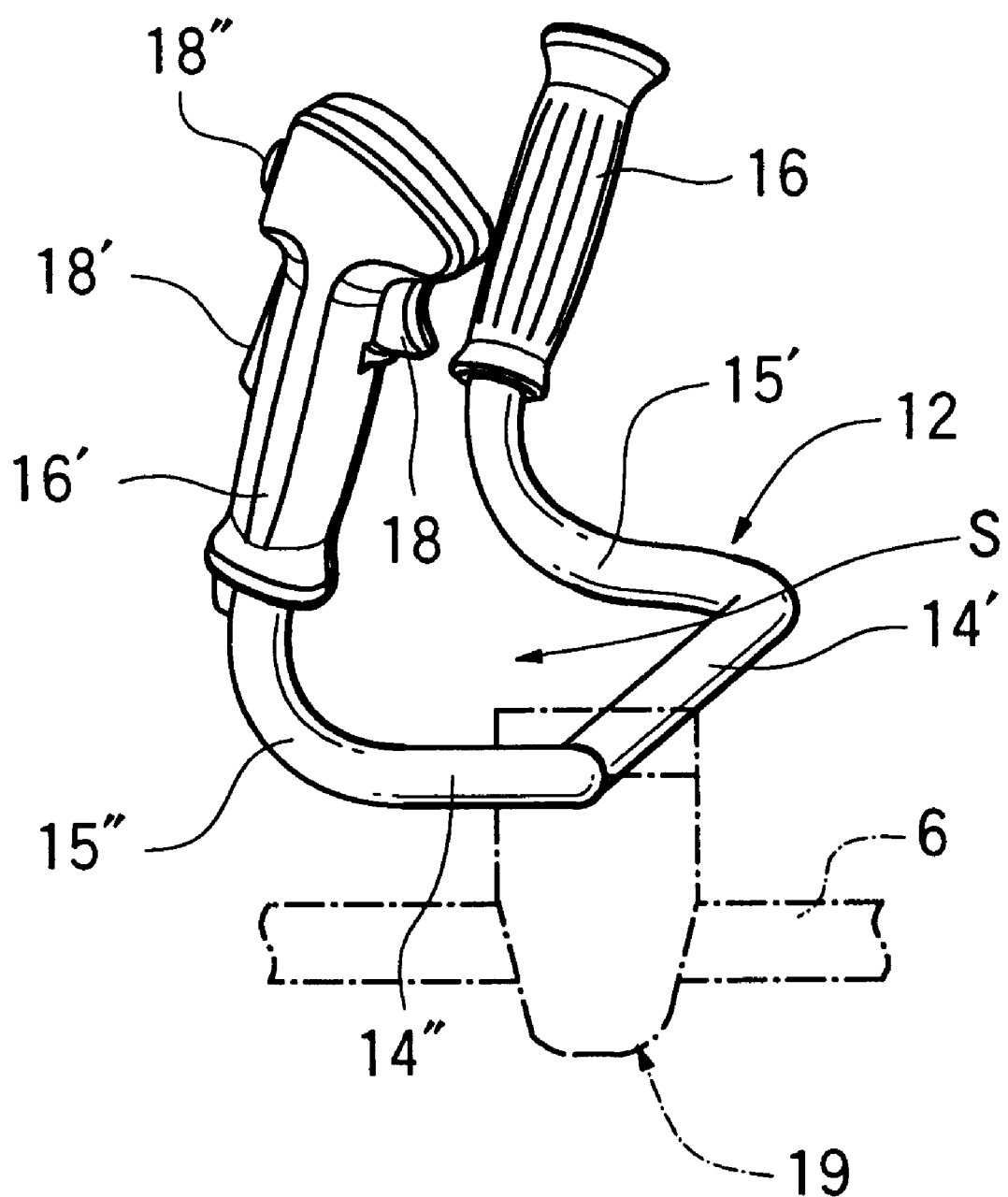
FIG. 4 is a right side view of the handle seen in a direction indicated by a line IV—IV in FIG. 2.

As depicted in FIG. 3, the left side portion 14' of the handle-bar 14 is inclined upwardly in a direction to being away from the supporting tube 6, i.e. from the right side of the hip toward the left side of the waist of the operator. Therefore, the bent portion 15' (see FIG. 4) of the handle-bar 14 is located at a height corresponding to the waist of the operator as shown in FIG. 3. The left grip 16 provided at the end thereof is located at the substantially same height as the left hand when the operator bends the left elbow and fixes at the left side of the body 17 in a natural posture while slightly inclining the upper body in a forward direction.

When carrying out the trimming operation, the operator cuts the plants in different ways depending on the kind thereof. First, when relatively soft plants such as weeds are cut, the operator moves the right and left hands which hold the grips 16, 16' in forward and rearward directions alternatively without twisting the waist, thereby moving the cutter 8 provided at the forward end of the supporting tube 6 to the right and to the left to cut the weeds. Secondly, when cutting relatively hard plants such as reeds, the operator fixes both arms at the sides of the body and holds the right and left grips 16, 16' to fix the position of the supporting tube 6, i.e. the cutter 8, with respect to the body 17 and twists the waist, thereby moving the cutter B in the right and left directions.

Figure 5:
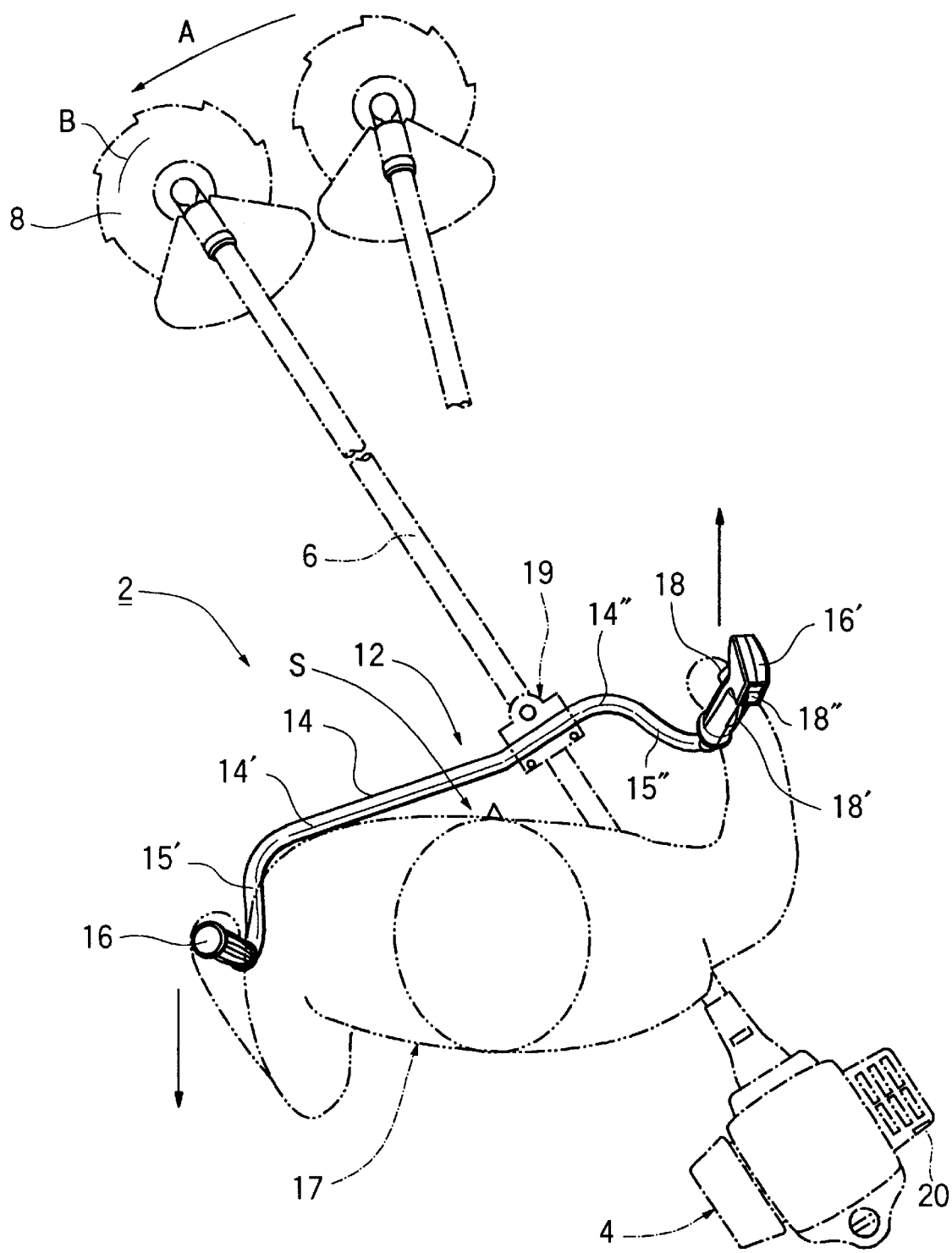
FIG. 5 is a view showing movements of the operator in a first case of cutting the plants by a light force.
Figure 6:
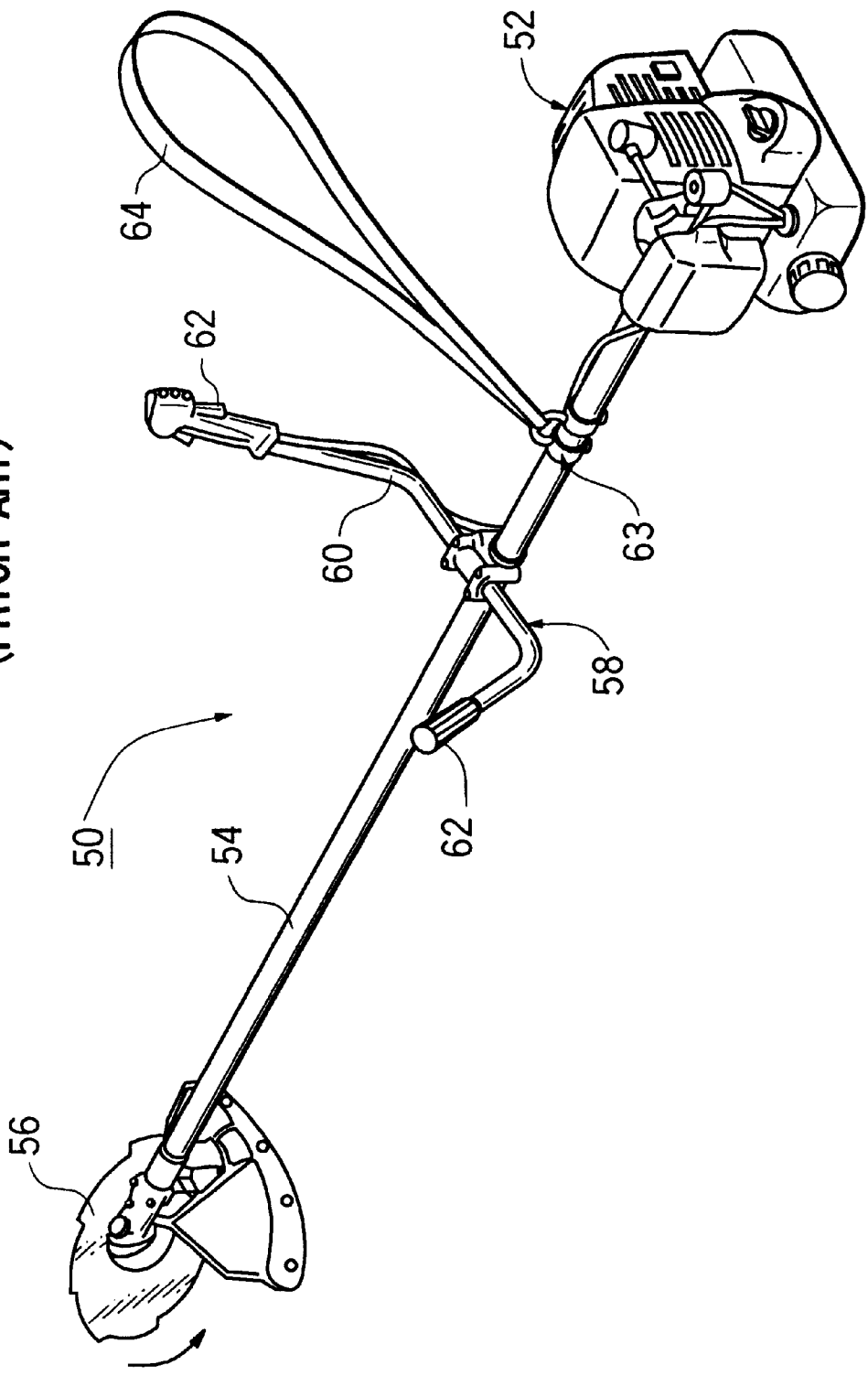
FIG. 6 is a perspective view of a conventional portable trimmer.

FIG. 5 shows the movement of the operator in the first case where the plants can be cut by a light force. The operator rearwardly moves the left elbow while keeping the elbow bent and forwardly extends the right arm, thereby moving the cutter 8 in a direction shown by an arrow A. As a result, the left bent portion 15' of the handle-bar 14 is located by the side of the waist of the operator and the body 17 is received into the U-shaped area S behind the handle-bar 14. The cutter 8 rotates in a counterclockwise direction as shown by an arrow B and serrations along a circumference of the cutter 8 are formed so that the weeds can be cut by a left arcuate portion of the cutter 8. Therefore, the weeds can be cut in an area where the cutter 8 moves in a direction shown by the arrow A. The operator cuts the weeds by moving the cutter 8 in the right and left directions as described herein above.

On the other hand, in the second case where the plants needs to be cut by a strong force, the operator bends both of the elbows and fixes at the sides of the body 17, thereby fixing a position of the cutter 8 with respect to the body 17 in a natural posture. Then, the operator twists the waist, thereby moving the cutter 8 to carry out the cutting operation.

In both cases, the cutter 8 is moved to the left and to the right symmetrically with respect to the center of the body 17. Therefore, the plants are cut while the cutter 8 forms a moderate arcuate locus, i.e. can cut the plants substantially straight in a lateral direction.

In accordance with the embodiment, since the body 17 is received into the space S behind the U-shaped handle-bar 14, the handle 12 can be pulled over a relatively long distance in a rearward direction, to move the cutter 8 in the left direction. It enables to cut the plants over a large area in one movement.

Further, in accordance with the embodiment, the left bent portion 15' of the handle-bar 14 is located at a height corresponding to the waist. Therefore, the operator can pull the grip 16 in a rearward direction in a natural posture by bending the elbows and fixing them at the sides of the body 17. It provides good handling capability. Further, the bent portion 15' does not interfere with the hip and therefore, does not give unpleasantness to the operator.

Furthermore, both left and right grips 16, 16' are slightly inclined in a upward and laterally outward direction with respect to the supporting tube 6, so that the operator can hold both grips 16, 16' in a posture, i.e. by bending the elbows and fixing to the sides of the body 17, which enables to fix the handle 12 in a easy manner. Therefore, the fatigue of the operator caused by the operation can be decreased.

Furthermore, in accordance with the embodiment, because the cutter 8 is located substantially at the center of and in front of the body 17, the cutter 8 is moved forming a moderate arcuate locus that is symmetric in the right and left directions with respect to the center line of the body 17. It facilitates to cut the plants by a wall without leaving uncut plants.

The present invention has thus been shown and described with reference to specific embodiments. However, it should be noted that the present invention is in no way limited to the details of the described arrangements but changes and modifications may be made without departing from the scope of the appended claims.

For example, although the portable trimmer 2 is constructed for the right handed operators, it can be constructed for the left handed operators by changing the shape thereof to a mirror symmetrical shape.

Further, as in the embodiment, it is preferable that the left side portion 14' of the handle-bar 14 is slightly bent in a forward direction so that the angle α is smaller than 90 degrees. However, the left side portion 14' of the handle-bar 14 does not need to be bent in a forward direction. For example, the portion of the handle-bar 14 may extend straight in a lateral direction with respect to the supporting tube 6 and intersect with the supporting tube 6 at a right angle. The left bent portion 15' which extends rearwardly from the end of the straight portion can be formed shorter than the right bent portion 15" so that the angle α between the supporting tube 6 and the phantom line O—O connecting the right and left grips 16, 16' forms an angle smaller than 90 degrees. By constructing the handle 12 in this manner, the cutter 8 can be located substantially at the center and in front of the body 17 of the operator.

Further, as the cutting device, a nylon cord, a reciprocating cutter or the like can be employed.

Furthermore, as driving means, a compact air-cooled 4-stroke internal combustion engine, an electrical motor or the like can be employed.

What is claimed is:

1. A portable trimmer for use by an operator, the portable trimmer comprising:

a) driving means;

b) a supporting tube extending straight from said driving means in a forward direction;

c) a cutting device provided at a forward end of said supporting tube; and d) a handle-bar that is mounted on a middle portion of said supporting tube at an intersecting point, the handle-bar having first and second grips extending in an upward direction from respective first and second ends of said handle-bar, said handle-bar having:

d1) a first portion extending with an upward inclination from the intersecting point across a width of a body of the operator and being bent in a rearward direction to said first grip; and d2) a second portion extending from the intersecting point to the second grip that is located substantially in front of a side of the body of the operator when the operator holds said first grip;

wherein said supporting tube is provided at an inclination with respect to a phantom line connecting said first and second grips such that said cutting device is located in front of a center of the body of the operator when the operator holds the first and second grips in a natural posture facing front.

2. The portable trimmer in accordance with claim 1, wherein:

said first portion is inclined upwardly from said supporting tube.

3. The portable trimmer in accordance with claim 2, wherein:

said second grip is located adjacent the side of the body of the operator when the operator holds said first grip.

4. The portable trimmer in accordance with claim 1, wherein:

said second grip is located adjacent the side of the body of the operator when the operator holds said first grip.

* * * * *